United States Patent [19]

Bronin et al.

[11] 4,078,409

[45] Mar. 14, 1978

[54] HIGH-SPEED HYDRODYNAMIC HAMMER

[76] Inventors: Georgy Konstantinovich Bronin, ulitsa Torpedo, 38, kv. 9; Jury Nikolaevich Byzov, ulitsa Deputatskaya, 11, kv. 29; Ivan Vasilievich Kononov, ulitsa Torpedo, 40, kv. 4; Jury Fedorovich Surinov, ulitsa Berezovaya roscha, 30, kv. 18, all of Voronezh; Viktor Ivanovich Nesterov, ulitsa Narodnogo opolchenia, 44, korpus 1, kv. 68, Moscow; Vladimir Alexeevich Pavlov, ulitsa Teatralnaya, 25, kv. 39, Dolgoprudny Moskovskoi oblasti; Alexei Andreevich Gusev, ulitsa Kostromskaya, 7, kv. 9, Voronezh, all of U.S.S.R.

[21] Appl. No.: 751,435

[22] Filed: Dec. 16, 1976

[51] Int. Cl.² ............................................ B21D 22/10
[52] U.S. Cl. ...................................... 72/63; 72/453.01; 227/130
[58] Field of Search ................... 72/56, 60, 63, 453.01, 72/453.02, 453.11, 453.1, 453.16; 227/130

[56] References Cited

U.S. PATENT DOCUMENTS

| | | | |
|---|---|---|---|
| 3,180,776 | 4/1965 | Hessel | 72/63 |
| 3,222,914 | 12/1965 | Morahan | 72/453.1 |
| 3,376,723 | 4/1968 | Cholminski | 72/453.1 X |
| 3,507,143 | 4/1970 | Gevy | 72/453.02 X |

Primary Examiner—Leon Gilden
Attorney, Agent, or Firm—Fleit & Jacobson

[57] ABSTRACT

The disclosed hammer comprises a power frame, having a working chamber for the deforming medium, a die block adapted to accommodate therein a blank and an impact head with a housing having fastened therein a hollow separating bush coaxial with the housing. Received concentrically within this bush is a sleeve enclosing a plunger mounted in this sleeve for vertical reciprocation, to define a working cylinder between the top end face of the plunger and the bottom of the sleeve. An annular space is defined by the housing of the impact head and the body of the separating bush, surrounding the working cylinder and communicating with the hydraulic hammer control system. The essence of the invention consists in that the working chamber for the deforming medium, has a built-in container having a bottom made of an elastic material. The container is mounted for cooperation of its bottom with the blank accommodated in the die block. In its turn, the die block is mounted for horizontal reciprocation, so that the blank can be placed thereupon outside the working chamber, whereafter the die block can be fed together with the blank to underlie the bottom of the container; the die block being also adjustable in a vertical plane to ensure a sealing engagement with the bottom of the container. The advantage of the present invention consists in higher efficiency of the disclosed hammer, as compared with the hitherto known hammers of a similar type.

6 Claims, 3 Drawing Figures

HIGH-SPEED HYDRODYNAMIC HAMMER

The present invention relates to pressing and forging equipment, and more particularly, it relates to high-speed hydrodynamic presses for stamping or forging metal sheets.

The present invention can be readily adapted for application in production of works of intricate configuration from common and hardly deformable sheet metal of a considerable thickness (5 to 8 mm), used in the rocket and aircraft building industries, in instrument-making industries, in the motor vehicle industry, and in chemical engineering.

Furthermore, the herein disclosed features of the construction of the impact head can be employed in high-speed units in other processing industries wherein the production process requires a relatively great working area, e.g. in a high-efficiency process of making faggots and bricks of bulk and loose materials by pulses of force, of making bimetal plates and strips; with a piston mounted instead of the diaphragm, the invention can be employed for producing extra-great force pulses which can be used for three-dimensional stamping and pressing, caulking, gauging, cutting rolled shapes and blanks, breaking scrap iron and steel.

To reduce the production costs under the conditions of individual or small-lot production of pressed and stamped articles, the industry nowadays resorts to pressing and stamping with liquids and elastic media, which enables the use of the simplest tools, because only one "half" of a die set is required in such cases.

At present, this technique is realized in specialized hydraulic presses of the tunnel type, or else in commonly used all-purpose presses which develop under the hydrostatic conditions a deforming effort applied to a blank, of a value of about 400 to 600 kg/cm$^2$, and are generally capable of handling materials 1.0 to 1.5 mm thick.

The attaining of greater deforming efforts, however, is associated with difficulties arising from the necessity of providing means for the transmission of the high pressure to its utilization area and also providing means for adequate sealing of high-pressure containers.

To shape by deformation materials of a great mechanical strength which are broadly used nowadays in constructions employed in aircraft and rockets, in motor vehicles and instruments, and also in general engineering, the required deforming effort is to be as high as 2,000–3,000 kg/cm$^2$ and even higher.

To satisfy this requirement, there have been recently developed rapid-action pulse-type stamping or swage hammers, including hydrodynamic hammers, wherein the kinetic energy of a plunger driven at a speed as high as 15 to 50 m/sec is transmitted to a deforming medium enclosed within the working chamber of the hammer.

Known in the art is a rapid-action hydrodynamic hammer for stamping sheet metal, comprising a power frame and an impact head. The power frame is mounted on a foundation plate by means of shock absorbers. The power frame receives therein a die block adapted to accommodate a blank and a working chamber adapted to accommodate a deforming medium for acting upon the blank.

The housing of the impact head has rigidly fixed therein, coaxially therewith, a hollow separating bush, the latter receiving therein a sleeve coaxial with the bush and concentrically enclosing a plunger. In its turn, the plunger is mounted in the sleeve for vertical reciprocation, to define a working cylinder between the top end face of the plunger and the bottom of the sleeve, the bottom end face of the plunger being received in the working chamber of the power frame.

The bottom end face of the plunger is adapted to actuate the deforming medium of the hammer, received in the working chamber of the power frame. Within the impact head, the housing of the impact head and the separating bush define therebetween an annular space encircling the working cylinder. This annular space is maintained in permanent communication with the hydraulic pressure line and is also periodically communicated to a high-pressure gas line, the annular space being further adapted to communicate via passages provided in the separating bush with the working cylinder during the plunger accelerating stage of the operating cycle.

The above-described hitherto known hammer is capable of relatively small deforming efforts on account of the absence of a means for locking mechanically the die block and of a means for sealing away the working chamber, it also offers relatively low productivity and is inconvenient to operate on account of the direct contact between deforming medium and the blank, which means that every finished article is to be subsequently rid of this deforming medium and the working chamber to be refilled with the deforming medium period to a successive impact.

Another inconvenience in the operation of the hitherto known hammer is caused by the absence of a means enabling to control the energy of the impact from the central control panel.

It is the main object of the present invention to provide a construction of a hydrodynamic hammer for stamping metal sheets, which should provide for a higher efficiency and a greater deforming effort of the hammer.

This and other objects are accomplished in a high-speed hydrodynamic hammer for stamping sheet metal articles, comprising a power frame mounted with aid of shock absorbers on a foundation plate, the frame having a working chamber for the deforming medium adapted to act upon a blank, a die block adapted to accommodate the blank and an impact head with a housing having rigidly and coaxially fixed therein a hollow separating bush, receiving therein a sleeve concentric with this bush, the sleeve enclosing a plunger mounted in the sleeve for vertical reciprocation, to define a working cylinder between the top end face of the plunger and the bottom of the sleeve, the plunger having its bottom end face received in the working chamber of the power frame, to act upon the deforming medium, an annular space being defined between the housing of the impact head and the body of the separating bush, this annular space encircling the working cylinder and communicating with the hammer's hydraulic control system, which hammer, in accordance with the present invention, further includes a container having a bottom made of an elastic material, mounted within the working chamber of the power frame for cooperation between this bottom of the container and the blank accommodated in the die block, the latter being mounted for reciprocation in a horizontal plane, so that the blank can be placed on the die block and the latter can be fed together with this blank to underlie the bottom of the container, the die block being also mounted for adjustment in a vertical plane, to provide for the sealing engagement of the die block with the bottom of the container.

Owing to the working chamber having mounted therein the container with the bottom made of an elastic material and being adapted to receive the movable die block there have been provided a possibility of improving the quality of the sealing engagement, to increase the load-carrying capacity of the working chamber and to step up the deforming pressure.

It is most expedient to provide for the vertical adjustment of the die block by mounting a movable wedge under the die, enabling to adjust the value of the effort urging the die against the bottom of the container, so as to ensure the sealing engagement of the die with the bottom of the container.

The invention is further characterized in that the hammer includes a slide valve rigidly connected with the bottom of the sleeve coaxially therewith, the slide valve being adapted for vertical reciprocation in its respective cylinder fastened on the housing of the impact head and communicating with the hammer's hydraulic control system via annular grooves made in the internal wall of the last-mentioned cylinder.

Owing to the construction feature of the impact head, providing for the slide valve rigidly connected with the sleeve and the valve cylinder rigidly fixed on the housing of the impact head, it has become possible to control from the central control panel the energy of the impact and, hence, the deforming effort, which additionally increases the efficiency of the hammer.

Another feature of the present invention is that the slide valve has formed in the side thereof, facing the sleeve, an axial passage ending with radial apertures alignable by the motion of the slide valve with the annular grooves in the slide valve body, whereby the working cylinder is brought in communication with the hammer hydraulic control system.

It is advantageous that the hammer include a work table rigidly fixed on the foundation plate outside the hammer proper, the table having mounted thereon a vertically arranged hydraulic cylinder adapted to force the pressed work from the die block, two horizontally arranged hydraulic cylinders adapted to actuate, respectively, the die block and the wedge, and guides adapted to cooperate with the die block as the latter is being retracted, to remove the finished work and to place a new blank.

Owing to the structure of the hammer unit including the work table outside the work performing area, accommodating thereon the hydraulic cylinders actuating the wedge and the die block and forcing the pressed work out of the die block, the efficiency of the hammer has been promoted and the operation thereof has been made more convenient, while owing to the connection between this stationary table and the vertically movable power frame, the latter has been relieved of lateral toppling forces applied to the frame by the operating cylinders actuating the die block and the wedge. It is most expedient from the engineering point of view that the hydraulic cylinders actuating the die block and the wedge should be pivotally mounted on the processing table, their piston rods being connected, respectively, to the die block and to the wedge by pivots.

The above feature provides for an adequately flexible connection between the members of thus actuating unit.

The present invention will be further described in connection with a detailed description of an embodiment thereof, with reference being had to the accompanying drawings, wherein.

Figure 1:
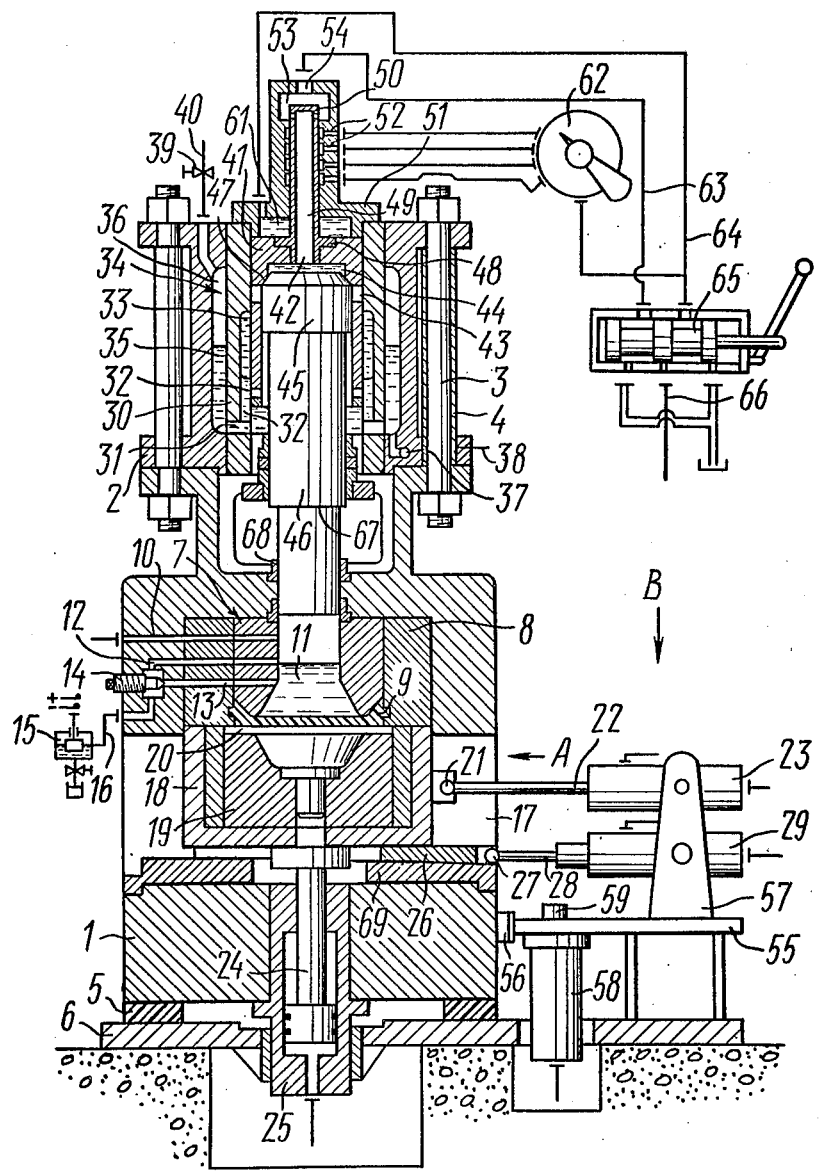
FIG. 1 is a longitudinal sectional view of a high-speed hydrodynamic hammer for stamping sheet metal according to the present invention.

Disclosure is made of a high-speed hydrodynamic hammer for stamping sheet metal.

The herein disclosed hammer has its main axis of symmetry extending vertically and includes a power unit enclosed within a power frame 1 (FIG. 1) and a housing 2 accommodating therein the high-speed drive of the impact portions of the hammer, i.e. an impact head.

The power frame 1 is rigidly connected by means of studs 3 and bushes 4 with the housing 2, forming therewith a single unit which is mounted by means of shock absorbers 5 (FIG. 2) on a foundation plate 6.

Mounted within the power frame 1 coaxially therewith is a high-pressure container 7 (FIG. 1). The walls of the container 7 are formed by two cylinders 8 received coaxially one within the other, whereas its bottom 9 is defined by a diaphragm separating the deforming medium from a blank, made from an elastic material. The container 7 has a passage 10 through which it can be filled with the deforming medium 11, a drain passage 12 for maintaining a predetermined top level of the deforming medium 11 in the container 7 and another drain passage 13 with a valve 14 for maintaining the bottommost level of the deforming medium 11 in this container 7. The presence of the deforming medium 11 in the container 7 is monitored by a sensor 15 mounted in the drain manifold 16.

Figure 2:
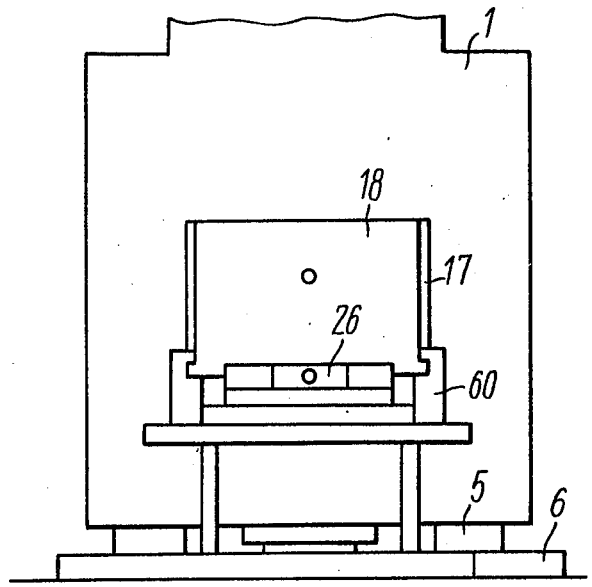
FIG. 2 is a view taken along arrow line A in FIG. 1.

Underlying the container 7 is a rectangular die block 18 (FIG. 2) with a replaceable die 19 and a blank 20 (FIG. 1), which can be bodily withdrawn and introduced in a horizontal plane through a port 17 (FIG. 2). The die block 18 (FIG. 1) is connected by means of a pivot 21 with the piston rod 22 of a hydraulic cylinder 23.

In accordance with the present invention, the container 7 with the bottom 9 made of an elastic material is mounted within the working chamber of the power frame 1 for cooperation of this bottom 9 with the blank 20 accommodated in the die block 18. The die block 18 is mounted for reciprocation in a horizontal plane, so that the blank 20 can be placed thereon, whereafter the die block 18 is fed together with this blank 20 to underlie the bottom 9 of the container Furthermore, the die block 18 is mounted for vertical adjustment, to provide for a sealing engagement of the die block 18 with the bottom 9 of the container 7.

The engagement of the container 7 with the die block 18 is effected by the piston rod 24 of a hydraulic cylinder 25 mounted in the bottom portion of the frame 1 and by a wedge 26 (FIG. 2) connected through a pivot 27 (FIG. 1) with the piston rod 28 of its respective hydraulic cylinder 29, the wedge 26 (FIG. 2) having a slit made through its centre, for the passage therethrough of the piston rod 24 (FIG. 1) of the hydraulic cylinder 25.

Fixed in the housing 2 rigidly and coaxially with this housing is a separating and guiding bush 30 having appertures 31 and splines or notches 32 received within an annular groove 33.

The bush 30 and the housing 2 define therebetween an annular space 34 filled partly with a working liquid, i.e. oil 35 and partly with a gas 36. The space 34 communicates permanently via a built in check valve 37 with a hydraulic pressure line 38 and periodically communicates via a valve 39 with a gas pressure line 40, whereby this space 34 acts as a hydro-pneumatic accumulator or pressure storage.

Telescopically received within the bush 30 is a sleeve 41 with a bottom having an opening 42 made therethrough, the sleeve 41 having also made therethrough radial ports 43 of a considerable cross-section, through which the working liquid 35 can flow into the working cylinder 44 defined between the bottom of the sleeve 41 and the top end face of a piston 45 made integral with a plunger 46. The engagement between the piston 45 and the sleeve 41 in the top position is effected by means of sealing bevels 47, both the piston 45 and the sleeve 41 each having this sealing bevel 47.

The bottom of the sleeve 41 has rigidly attached thereto a slide valve 48 having an axial passage 49 in the side thereof, adjacent to the sleeve 41, this passage 49 ending with radial apertures 50.

Figure 3:
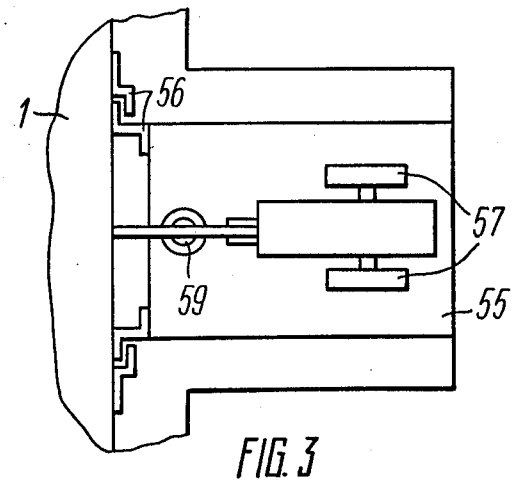
FIG. 3 is a view taken along arrow line B in FIG. 1.

The slide valve 48 is received for vertical reciprocation in a cylinder 51 rigidly fixed on the housing 2 and having in the internal cylindrical surface thereof annular grooves 52 made at different levels, as well as an annular groove 53 with an aperture 54 for communication with the control system. Arranged next to the hammer proper, in front of the latter is a work table 55 (FIG. 3) fixedly mounted on the foundation and connected by braces 56 with the movable power frame 1. The table 55 has brackets 57 pivotally supporting the hydraulic cylinders 23 and 29 actuating, respectively, the die block 18 and the wedge 26; besides, the table 55 has fixedly mounted thereon a hydraulic cylinder 58 (FIG. 1) of a pusher device 59. The table 55 also supports thereon guides 60 (FIG. 2) along which the die block 18 is adapted to move toward the work removal position.

The herein disclosed hammer operates as follows.

In the initial position the die block 18 is on the table 55. The plunger 56 and the sleeve 41 are retained in the raised position by the pressure of the gas 36 acting through the working liquid 35, respectively, upon the raising shoulder of the piston 45 and on the end face of the open end of the sleeve 41. The level of the working liquid 35 within the annular space 34, maintained by the hydraulic drive system and the system of appropriate controls and distributors (not shown in the drawings) is at the top position.

The container 7 has no deforming medium therein. The herein disclosed hammer is operable in two modes, viz. in a hammer mode (i.e. the operating mode) and in a press mode (i.e. the adjustment mode). In the hammer mode of the operation an operating cycle is opened by placing a blank 20 into the die 19, whereafter the operation is effected in the following sequence. The die block 18 is forwarded into its operative position into the power frame 1 by the hydraulic cylinder 23 into which the working liquid 35 is fed by the hydraulic system. Then the hydraulic cylinder 25 is operated for its piston rod 24 to lift the die block 18 into the latter's top-most position, i.e. the position of the engagement between the blank 20 and the bottom 9. The wedge 26 which has a small inclination angle is introduced by its respective hydraulic cylinder 29 into the frame 1 and urges the die block 18 against the container 7 with a great effort. A limit switch (not shown) responds to the last few millimeters of the stroke of the wedge and sends a signal to fill the container 7 with the deforming medium 11 to a level preset beforehand by means of the valve 14 (i.e. either the top level or the bottom one). The sensor 15 responding to the presence of the deforming medium in the container 7 overrules an interlock (not shown) in the control system, whereby the distributor 65 can be switched over, to supply the working liquid 35 from the hydraulic pressure line 66 into the space 61. With the space 61 communicating with the pressure line 66 under the pressure of the working liquid 35 acting upon the bottom of the sleeve 41, the latter moves downward in a preparatory stroke, pushing the piston 45 in front of itself. Now the radial openings 43 align with the annular groove 33 of the sleeve 30. With the sleeve 41 moving on jointly with the slide valve 48, the moment the radial apertures 50 align with one of the annular grooves 52, connected by the distributor 62 to the pressure line, the working liquid 35 is supplied under pressure into the working cylinder 44. Then the working liquid acts upon the top end face of the piston 45 and thus breaks the sealing engagement of the bevels 47, the working cylinder 44 now communicating with the annular space 34 through the ports 43 in the sleeve 41, the spline passages 32 and the apertures 31 in the bush 30. Now follows the acceleration of the plunger 46, ending with an impact of the plunger 46 against the deforming medium 11 in the container 7. The pressure now built up instantly within the container 7 acts through the bottom 9 made of an elastic material upon the blank 20 which thus acquires the shape of the die 19. With the kinetic energy of the plunger 46 fully spent, the latter moves on under the pressure acting from the working cylinder 44, until the abutment 67 of the plunger 46 abuts against the abutment 68 of the power frame 1. Following the switching over of the distributor 65, the space 61 communicates with drain, and the pressure of the working liquid 35 acting from the space 34 upon the sleeve 41 returns the latter into its initial position, the ports 43 of the sleeve 41 closing. As the radial apertures 50 of the slide valve 48 align with the groove 53 connected to drain, the working cylinder 44 also becomes connected to drain, while the plunger 46 is returned into its initial position by the pressure of the working liquid 35 acting upon the raising shoulder of the piston 45, the plunger 46 forcing the working liquid 35 from the working cylinder 44 into a tank (not shown).

The associated hydraulic pump is operated to recharge the accumulator or the pressure storage. The hydraulic cylinder 29 has the working liquid 35 supplied into its above-piston space, whereby the wedge 26 is retracted onto the table 35, the die block 18 lowering upon the guides 60 provided in the frame 1. The hydraulic cylinder 23 is operated to retract the die block 18 along the guides 60 onto the table 55, into the work removal position. The hydraulic cylinder 58 has its under-piston space connected to the source of the working liquid 35 under pressure and pushes the shaped blank 20 from the die 19. By this time the recharging of the accumulator of pressure storage is completed, and the pumps are switched over by an automatic device (not shown) to drain. The operating cycle is completed.

In a press or adjustment mode the herein disclosed hammer operates in the following sequence.

The working liquid 35 is directed by the distributor 65 from the pressure line 66 via the conduit 63 to the opening 57 wherefrom the working liquid 35 is supplied via the annular groove 53, the radial apertures 50 and the passage 49 within the slide valve 48 directly into the working cylinder 44, whereby the plunger 46 is urged downward at a speed which can be controlled within a broad range by the distributor 65. With the distributor 65 switched over, the working cylinder 44 is connected to drain, and the plunger 46 is returned into its initial position at a rate defined by the degree of the opening if the distributor 65.

The herein disclosed hammer offers substantial assets and advantages over the hitherto known hammers of its type.

The hammer develops a deforming effort upon a blank, which is as high as 2,000 to 2,500 kg/cm$^2$, which enables to shape thick sheet metal of a considerable strength, as well as shaping of articles of intricate configuration and increased structural rigidity, and that with a high quality of the shaped articles thus obtained. The hammer is equivalent to a static press with a 7,000 ton effort, while the weight of the hammer is but one tenth to one eighth of the static press.

The energy of the impact, and, hence, the shaping effort can be infinitely controlled from the control panel within a broad range of values.

Owing to the unique design of its impact head, the hammer features a high efficiency factor, the power requirements of the hammer being one third to one half of that of the hitherto known high-speed hammers with the same impact energy.

The efficiency factor of the impact performed by the herein disclosed hammer is 4 to 6 times as great as that of electro-hydraulic stamping and explosion stamping.

The hammer consumes practically no high-pressure gas and, owing to the possibility of using only one member of a die set, it enables to cut down the cost of tools.

Owing to the use of the working liquid for actuation of the plunger, there are created ideal conditions for sealing away the gas in the accumulator or pressure storage device, and the parts subject to friction are lavishly lubricated.

Due to the high speed of the plunger and the extra-short duration of the process of the impact, it has been made possible to effect the engagement of the plunger and container without special sealing means, which steps up the reliability of the operation and simplifies the manufacture of the high-pressure container.

Owing to the mechanisation of the feeding of blanks and of the removal of shaped articles, to the high plunger speeds and to the reduced number of transfers in the technology, high productivity can be obtained.

The hammer is significantly safer than a plant for electro-hydraulic stamping or one for explosion stamping.

What is claimed is:

1. A high-speed hydrodynamic hammer for stamping sheet metals, comprising a power frame, a foundation plate, means for supporting said power frame on said foundation plate comprising shock absorbers, said power frame comprising a working chamber for performing the stamping of sheet metal blanks, said working chamber including a container having a bottom portion of elastic material to cooperate with a blank during stamping, said container containing a deforming medium, a die block, means for mounting a blank on said die block, means for reciprocating said die block horizontally into and out of said working chamber for feeding said blank into a position underlying the bottom of said container, means for displacing said die block in a vertical direction toward the bottom of said container for providing a fluid-tight seal of said die block and the bottom of said container, an impact head means for providing impact to the bottom of said container to shape the blank mounted on the die block, comprising a housing, a hollow separating bushing rigidly and coaxially affixed within said housing, said hollow separating bushing and said housing defining an annular space therebetween, a sleeve having a bottom portion, and means for mounting said sleeve for reciprocation within said hollow separating bushing and coaxial therewith, a plunger having top and bottom end faces, means for mounting said plunger for vertical reciprocation within said sleeve, wherein the bottom end face of said plunger projects into said container of said working chamber, hydraulic control means for controlling the reciprocation of said plunger, and means for communicating between the hydraulic control means and said annular space, whereby the impact of said plunger on the deforming medium within said container deforms the elastic bottom of said container to shape the blank in conformance with the die block.

2. A high-speed hydrodynamic hammer as set forth in claim 1, further comprising a movable wedge means mounted under said die block for adjustably urging said die block against said bottom of said container, so as to ensure the fluid-tight engagement between said die block and said bottom of said container.

3. A high-speed hydrodynamic hammer as set forth in claim 1, further comprising a slide valve rigidly connected with the bottom of said sleeve and coaxial therewith, a cylinder housing mounted on said housing of said impact head means, means for vertically reciprocating said slide valve within said cylinder housing, said cylinder housing including annular grooves in the internal wall of said cylinder housing and means for connecting said annular grooves to the hydraulic control means.

4. A high-speed hydraulic hammer as set forth in claim 3, wherein said slide valve includes an axial passage extending from the side adjacent said sleeve and ending with radial apertures which can be aligned by the reciprocation of the slide valve with the annular grooves in said cylinder housing, to establish communication between the internal area of said sleeve and the hydraulic control means.

5. A high-speed hydrodynamic hammer as set forth in claim 1, further comprising a work table rigidly fixed on the foundation plate adjacent said power frame, said work table having mounted thereon a vertically extending hydraulic cylinder means for pushing a workpiece out of said die block, horizontally extending cylinder means for actuating said die block and said wedge means, and guideway means for cooperating with said die block, as the latter is retracted for removing a shaped workpiece therefrom and for guiding a new blank placed thereupon.

6. A high-speed hydrodynamic hammer as set forth in claim 5, wherein the horizontally extending cylinder means are mounted on the work table for pivoting thereon, the piston rods of said horizontally extending cylinder means pivotally connected with said die block and said wedge means.

* * * * *